Aug. 24, 1965   A. R. CHASAR   3,202,303
REVERSING LOAD STOP
Filed April 4, 1962   4 Sheets-Sheet 1

INVENTOR.
ANTHONY R. CHASAR
BY
Meyer, Baldwin, Doran & Egan
ATTORNEYS

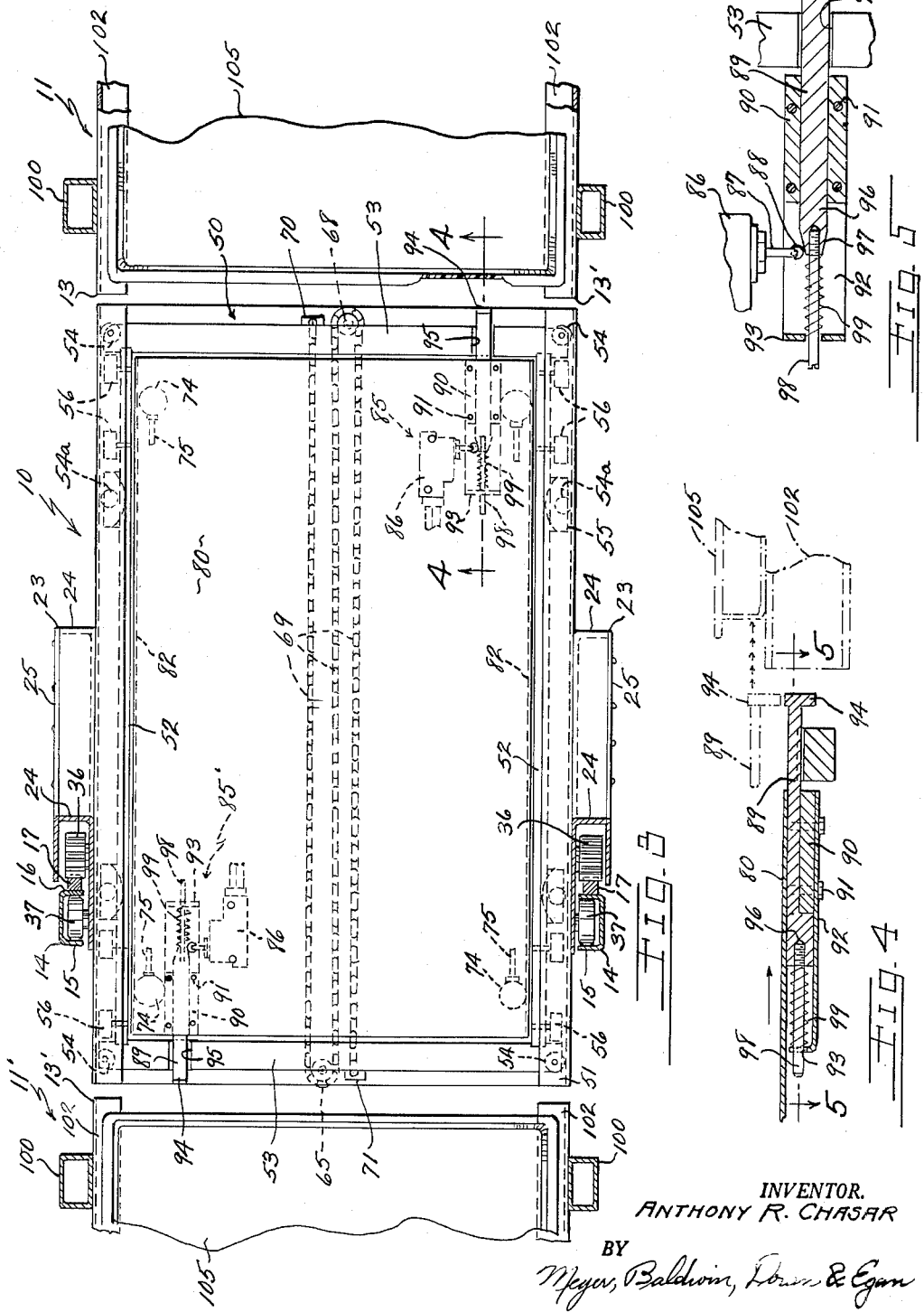

INVENTOR.
ANTHONY R. CHASAR
BY
Meyer, Baldwin, Doran & Egan
ATTORNEYS

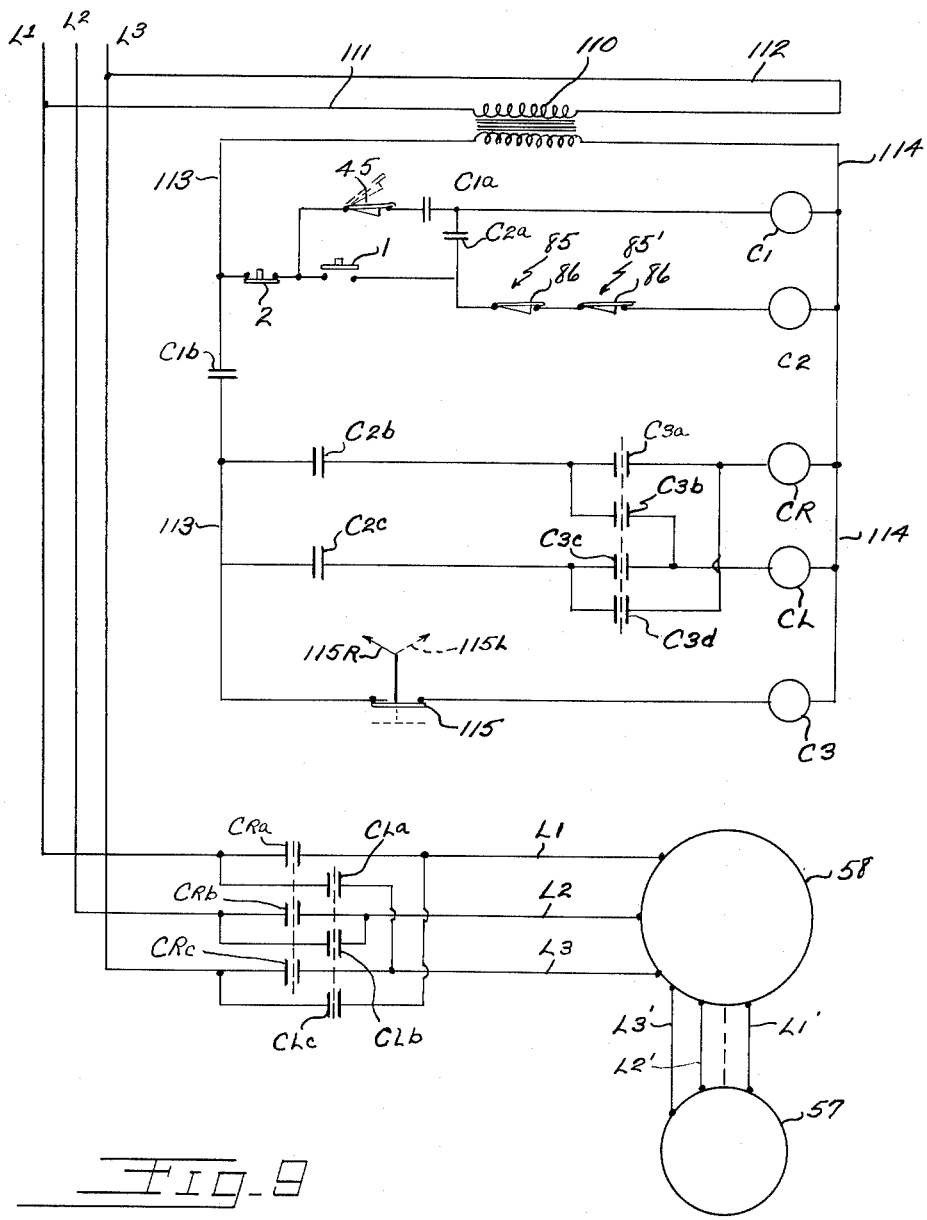

United States Patent Office 3,202,303
Patented Aug. 24, 1965

3,202,303
REVERSING LOAD STOP
Anthony R. Chasar, Cleveland, Ohio, assignor to The
Triax Company, Cleveland, Ohio, a corporation of Ohio
Filed Apr. 4, 1962, Ser. No. 185,058
6 Claims. (Cl. 214—16.4)

This invention relates generally to power operated load storage apparatus and more particularly to a reversing safety mechanism therefor. The load storage apparatus referred to comprises a storage frame having a plurality of load supports and a load carrier capable of moving a load to the different supports and into the storage frame.

The storage frame of the apparatus is preferably of the open type which provides a pair of cooperating ledge members across which a flat load is bridged at each of the load supports. An example of the type of frame which can be used comprises two parallel rows of spaced, upright posts joined across the rows by horizontal struts. The struts are mounted on mutually facing sides of adjacent posts to provide cooperating ledges for supporting opposite edges of a rectangular load such as a tray, pallet, or the like. The load supports may be provided in vertical and/or horizontal rows; and the load carrier, which is movable vertically and/or horizontally, is adapted to move to any one of the load supports to deliver a load thereto. The carrier has an extractor mechanism which moves laterally between the struts of a load support to deposit a load thereon or retrieve a load therefrom.

Two storage frames of the type described can be provided, one on either side of the path of the carrier. The extractor is then adapted for movement laterally in either direction away from the carrier whereby to deposit or retrieve a load at a load support of either frame.

The carrier has power means for executing its various movements, and a suitable control means is preferably provided to cause the carrier to go through all or parts of a complete cycle of delivering a load to or retrieving it from a selected load support. A detailed disclosure of a load storage apparatus as generally described above, including fully automatic control means therefor, will be found in my copending application, Serial No. 66,776, filed November 2, 1960, now Patent No. 3,139,994, and entitled Mechanical Load Handling, Transfer and Storage Equipment.

The open type storage frame has many advantages such as great strength for the amount of material used, a substantial saving in material over solid wall type frames, considerable ease in construction, and excellent visibility of the articles stored. However, a particular problem which arises in the use of such frames, and particularly in association with a powered carrier, is that an inadvertent attempt by the carrier operator to load an already loaded load support with the consequent danger of showing the load already on the load support out the back of the frame. It is to the important object of preventing such accidents that this invention is primarily directed.

The inventor provides a reversing mechanism which automatically reverses the path of movement of the carrier if the carrier is loaded and attempts to deposit its load on an already loaded support. Since loads vary greatly in weight and since they are only supported at their edges, there is the additional danger that an extremely light load will be shoved out of the frame either without actuating the reversing mechanism or before such actuation can have its full effect. For example, a rapidly moving carrier might strike a light tray with such force as to knock it out of the storage frame even though the carrier immediately reversed its direction of movement. It is a further object of this invention to obviate such mishaps with light loads.

Other objects and advantages of the invention and the invention itself will be apparent from the following description and the accompanying drawings, in which said drawings:

FIG. 3 is a horizontal section of the carrier taken along the line 3—3 of FIG. 1;

FIG. 4 is a section taken along the line 4—4 of FIG. 3;

FIG. 5 is a section taken along the line 5—5 of FIG. 4;

FIG. 9 is a simplified electrical diagram of a reversing control mechanism of the invention.

Figure 1:
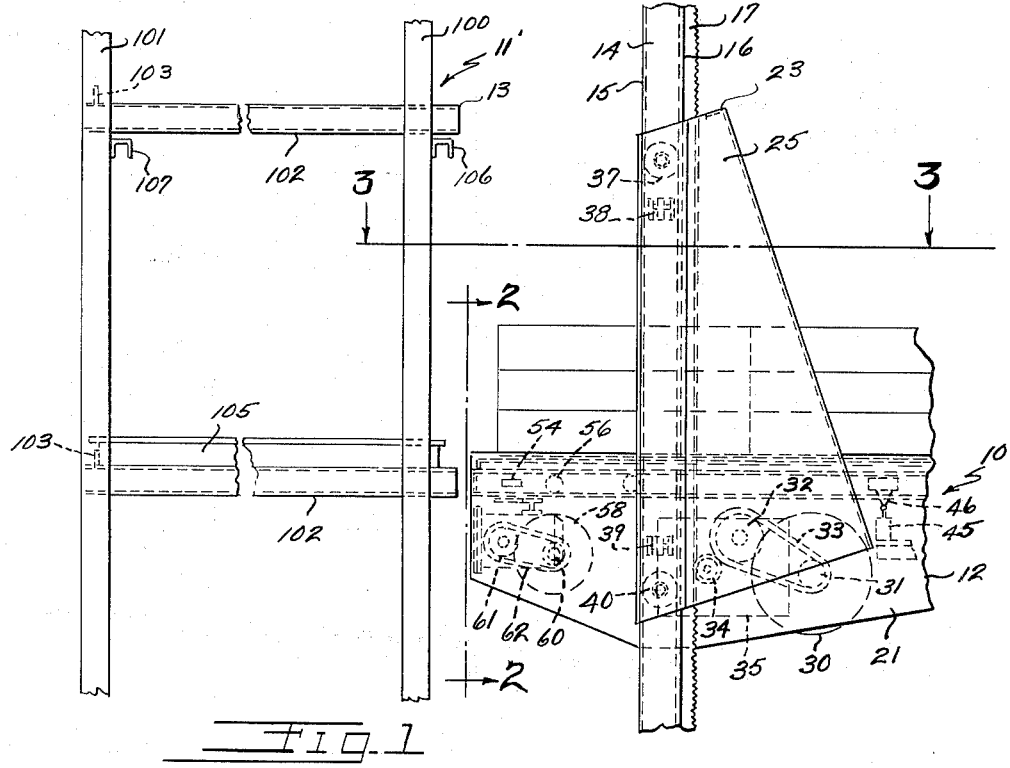
FIG. 1 is a side elevation of a portion of a load carrier and an associated load storage frame.

Referring now particularly to FIGS. 1 and 3, a load carrier is shown generally at 10 which is adapted for moving a load at least vertically between and closely adjacent a pair of spaced, oppositely facing load storage frames indicated generally at 11 and 11'. The load carrier comprises a vertically movable frame 12 which is movable past horizontally aligned load supports 13 and 13' of the load storage frames 11 and 11' respectively.

The vertically movable frame 12 is disposed between a pair of vertical masts 14 which are parallel and spaced from each other in a direction at right angles to the spacing between the load storage frames 11 and 11'. The vertical masts 14 are channel shaped in section with their open sides facing each other. Said masts have flanges 15 and 16 with the latter flange of each mast carrying at its outer surface a rigidly connected rack 17.

Figure 2:
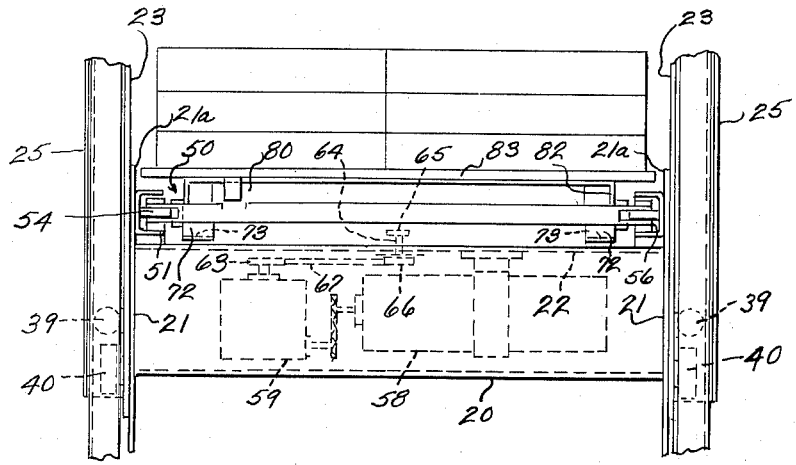
FIG. 2 is an end elevation of the carrier as viewed from the line 2—2 of FIG. 1.

Referring now also to FIG. 2, the vertically movable frame 12 comprises a motor housing 20 which extends substantially the distance between opposite load supports 13 and 13' and has side walls 21 which project upwardly and downwardly a substantial distance above and below an upper wall 22 of said housing. A pair of upwardly tapering, plate-like stabilizers 23 are secured flatwise at their lower end portions against the outer surfaces of the side walls 21 and project upwardly a considerable distance thereabove. One edge of each stabilizer is generally aligned with the flange 15 of the adjacent mast 14, and the opposite, oblique edge projects in the direction of the storage frame 11' and has a right angularly bent flange 24 which projects outwardly from the vertically movable frame 12. Upwardly tapering cover plates 25 are carried by the outer edges of said flanges 24, said cover plates extending in the direction of the storage frame 11 to overlap a portion of each adjacent rack 17.

A motor 30 is mounted in the motor housing 20 and drives a shaft 34 through a pair of pulleys 31 and 32, a pulley belt 33 and a suitable transmission 35. The shaft 34 is disposed at right angles to and projects through the side walls 21, and the ends of said shaft carry gears 36 which mesh with the teeth of the vertically directed racks 17. The motor 30 is preferably of the electric type and is reversible whereby, through suitable control means, the vertically movable frame 12 is driven upwardly or downwardly along the vertical masts 14.

The stabilizers 23 carry suitable rollers 37, 38, 39, and 40 to effect a smooth rolling engagement between the masts 14 and the vertically movable frame 12. Each stabilizer 23 carries a roller 37 adjacent its upper end and a roller 40 adjacent its lower end which are disposed between the flanges 15 and 16 of the adjacent mast and which are axially parallel with said flanges. Each stabilizer also carries a roller 38 adjacent its upper end and a roller 39 adjacent its lower end which are mounted on axes horizontally parallel with the web of the adjacent mast. The rollers 37 and 40 make rolling engagement with the flanges 15 and 16 and because of the distance between them effectively maintain the vertically movable frame 12 in a horizontal position as shown in FIG. 1. The rollers 38 and 39 engage the webs of the mast 14 thereby effectively maintaining the vertically movable frame in its horizontal position as seen in FIG. 2.

The vertically movable frame 12 carries a horizontally movable extractor 50 which is movable laterally relative to the vertically movable frame either to the right in the direction of the load storage frame 11 or to the left the direction of the load storage frame 11'. The extractor 50 is disposed between upwardly projecting wall portions 21a of the side walls 21 which extend above the upper horizontal wall 22 of the motor housing 20. The upper wall portions 21a have rigidly secured thereto a pair of channel shaped guides 51 each disposed with its web in flatwise engagement with the inner surface of one wall portion. The channel guides are disposed crosswise between the load storage frames 11 and 11' whereby they may be brought into alignment with a pair of opposite load supports 13 and 13'.

The extractor 50 comprises a pair of elongated side members 52 disposed parallel with and partially within the channel guides 51 respectively. The ends of the side members 52 are respectively connected by end members 53 which are welded or otherwise suitably secured to the side members and extend into the channel guides 51 beyond said side members.

As shown in FIGS. 2 and 3, the outwardly extending ends of the end members 53 are bifurcated in such manner as to mount rollers 54 on vertical axes for rolling engagement with the webs of the channel guides 51. A plurality of similarly disposed rollers 54a are mounted on the outer sides of the side members 52 by means of slotted roller mounting brackets 55. The side members 52 also carry a plurality of rollers 56 mounted upon horizontal axes in such manner as to rollingly engage the bottom flanges of the channel guides 51. The rollers 54, 54a, and 56 enable the extractor 50 to move easily and smoothly in either direction along the channel guides 51.

As shown in FIGS. 1 and 2, power means for moving the extractor 50 in either direction comprises a reversible electric motor 58 drivingly connected to a transmission 59 through pulleys 60 and 61 and pulley belt 62. The motor and transmission are suitably mounted within the motor housing 20, and said transmission has an axially vertically disposed driving gear 63 disposed just below the upper wall 22 of the motor housing 20. A vertical shaft 64 is journaled in and projects through the upper wall 22 and carries a sprocket 65 above said wall and a gear 66 below said wall. Gear 66 is connected to the gear 63 by a pulley belt 67 whereby rotation of the driving gear 63 in either direction causes a corresponding rotation in the gear 66 and the sprocket 65.

When the extractor 50 is centered between the storage frames in the channel guides 51, the sprocket 65 is disposed generally beneath one of the end members 53 as that end of the vertically movable frame 12 which is disposed adjacent the load storage frame 11'. The opposite end of said vertically movable frame carries an idler sprocket 68 which is disposed generally beneath the other end member 53. A chain 69 extends from a bracket 70 on the end member adjacent the idler sprocket 68 around the drive sprocket 65, then around the idler sprocket 68, and is connected at its other end to a bracket 71 of the end member which is adjacent said drive sprocket.

By the chain and sprocket arrangement just described, rotation of the drive sprocket 65 in the clockwise direction as shown in FIG. 3 will cause the extractor 50 to move toward the right or in the direction of the load storage frame 11. Rotation of said drive sprocket in the counterclockwise direction will cause a reverse movement of said extractor in the direction of the load storage frame 11'. Suitable controls, to be later herein fully discussed, are provided for causing the extractor to be moved either to the right or left to deposit a load at a selected load support 13 or 13' of one of the load storage frames 11 or 11'.

The extractor 50 carries a vertically movable platform 80 which closely interfits the area defined by the side members 52 and the end members 53, said platform having downwardly directed flanges 82 disposed along its edges adjacent to said side members. Adjacent to each end of each side member 52 there is provided a jack housing 72 which is secured to the adjacent side member and projects downwardly therefrom and inwardly beneath the adjacent edge portion of the platform. Each jack housing 72 has a horizontal base 73 upon which is mounted a preferably hydraulic jack 74. It will be understood that the hydraulic jacks at the four corners operate unitarily in response to pressure fluid directed thereto through fluid lines 75 to raise the platform 80 and a load carried thereby. The vertical movement afforded by the jacks 74 moves the platform 80 between a position wherein its upper surface is substantially below the upper flanges of the channel guides 51 to a position whereby said upper surfaces are disposed substantially above the level of said upper flanges.

At two diagonally opposite corners of the platform 80 there are provided reversing switch assemblies generally indicated at 85 and 85' in FIG. 3. Since the switch assemblies are identical, only the assembly 85 will be described in detail and it will be assumed that like numbers refer to like parts of the assembly 85'. Each assembly comprises a limit switch 86 having a horizontally disposed operative member 87 carrying a small roller 88 at the end thereof. The operative member 87 is disposed parallel with the adjacent end member 53 or at right angles to the adjacent side member 52. Said operative member is a plunger type whereby movement inwardly in the direction of its axis trips the switch 86.

Referring to FIGS. 4 and 5, the operative member 87 is depressed in use by a reject arm 89 disposed at right angles to and closely adjacent to the operative member 87. The reject arm 89 is slidably mounted contiguous to the lower surface of the platform 80 by a suitable grooved slide block 90 which is secured to the platform by small bolts 91. The slide block 90 is disposed adjacent to the edge of the platform 80 and has mounted upon its lower surface an L-shaped housing 92 which projects backwardly away from the edge of the platform and has at its distal end an upturned, bifurcated flange 93. The bolts 91 project through the horizontal portion of the housing 92 as well as the slide block 90 whereby said housing is secured in place.

The reject arm 89 projects forwardly beyond the adjacent edge of the platform and beyond the adjacent end member 53 and is provided at the outwardly directed end thereof with a perpendicularly disposed abutment member 94. Each end member 53 has an upwardly open groove 95 into which the reject arm 89 loosely seats when the platform 80 is in its lowered position.

The end of the reject arm 89 which is directed inwardly from the adjacent edge of the platform has a thickened portion 96 which is stepped downwardly behind the slide block 90 and which, as seen from above in FIG. 5, is rearwardly tapered as indicated at 97. A guide rod 98 is thread fitted at one end thereof into the thickened portion 96 and projects through the bifurcated flange 93. A coil spring 99 is telescoped over the guide rod 98 and interpositioned between the thickened portion 96 and the bifucated flange 93. The coil spring maintains the reject arm in its most outwardly thrust position beyond the edge of the platform 80 and in such position that the narrowest portion of the taper 97 is disposed adjacent the rollers 88 of the operative member 87 of the switch. Movement of the reject arm inwardly towards the platform actuates the operative member 87 by camming the wheel 88 toward the associated switch as it rides up the taper 97.

To summarize the foregoing description briefly, the extractor 50 is carried in a vertical path by the vertically movable frame 12 and rolls laterally toward either of the load storage frames 11 or 11' by means of its rollers engaging the channel guides 51. The extractor 50 carries the vertically movable platform 80 upon which a load is supported and which is movable between a position above and a position below the level of the upper flanges of the channel guides 51. The reversing switch assemblies are carried by the platform 80 and are, therefore, raised and lowered with said platform. If one of the reject arms strikes a resistant object as the extractor moves toward one of the storage frames, one of the switches 86 is actuated whereby to reverse the movement of the extractor in a manner to be hereinlater more fully described.

The load storage frames 11 and 11' are substantially identical in structure but are so positioned on either side of the carrier 10 as to be, in effect, mirror images of each other. Like parts of the different storage frames will, therefore, be given like reference numerals since a description of one of them is identical with a description of the other.

Figure 6:
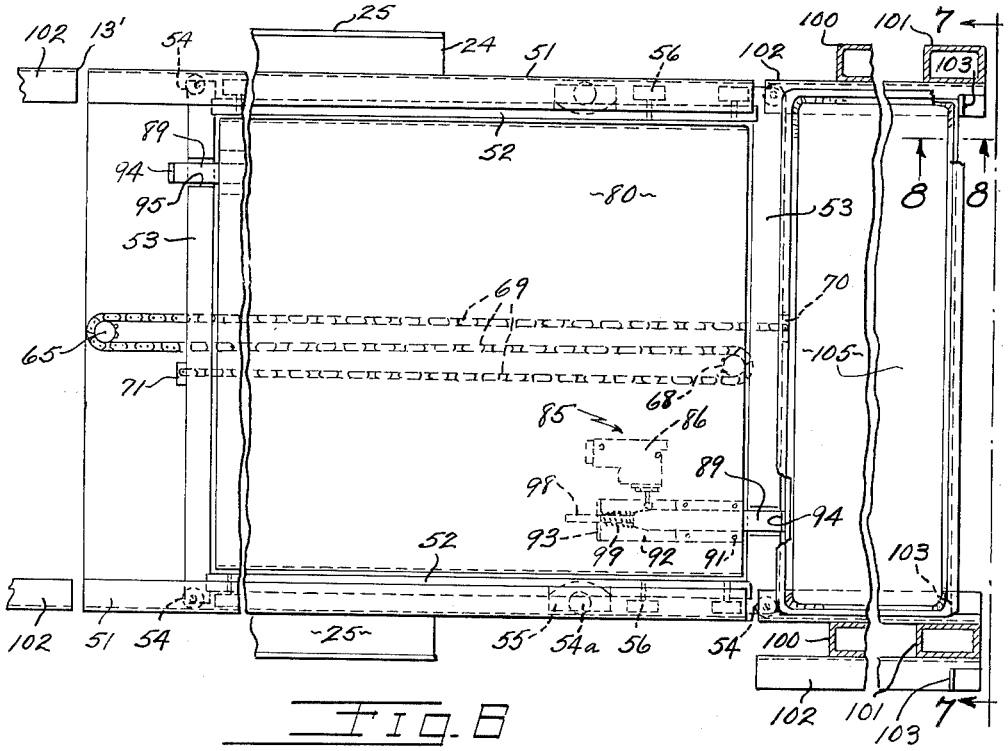
FIG. 6 is a view similar to FIG. 3 showing the carrier in another operative position.
Figure 7:
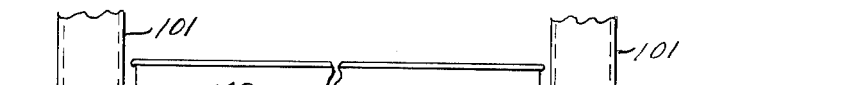
FIG. 7 is a rear elevation, partially broken away, of a load support viewed from the line 7—7 of FIG. 6.
Figure 8:
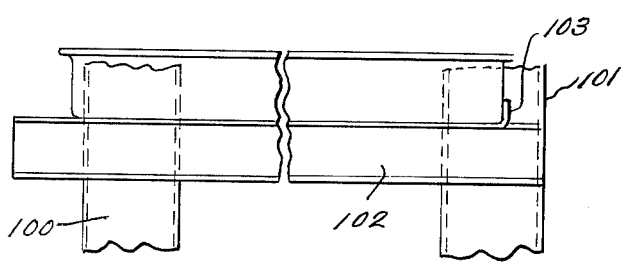
FIG. 8 is a side elevation, partially broken away, of a load support strut.

Referring now to FIGS. 6-8, a load storage frame comprises at least two pairs of spaced, vertically upright posts 100 and 101. The posts 100 are disposed adjacent to the carrier and will hereinafter be referred to as aisle posts, and the posts 101 are spaced away from the carrier and will hereinafter be referred to as the outer posts. Said posts as herein illustrated are of rectangular tubular construction to afford maximum strength to the structure for minimum weight and cost of materials. The load supports 13 and 13' each comprise two horizontally disposed, channel shaped struts 102 identical in size with the channel guides 51. Each strut is connected at respective ends thereof to a post 100 and a post 101, and the struts are arranged in pairs with their open sides facing each other. Each pair of struts have the same laterally spaced relationship as the channel guides 51 and are disposed with their webs flatwise against mutually facing sides of the posts in such manner that their flanges engage and receive the extractor 50 as it moves laterally out of the channel guides 51.

The struts 102 project beyond the aisle posts 100 a short distance and terminate in the opposite direction adjacent to the outer surfaces of the outer posts 101. The aisle posts 100 are preferably securely connected by one or more stringers 106, and the outer posts 101 are preferably similarly connected by one or more stringers 107. It will be understood that all of the above mentioned storage frame elements are welded or otherwise suitably secured together to effect a solid structure.

As shown in FIG. 8, a portion of the upper flange of each strut 102 adjacent the associated outer post is bent vertically upwardly to form a stop 103. The upper flanges of a pair of mutually facing struts 102 are adapted to support a load placed thereon by the carrier, and the stops 103 coact with the reject mechanism under conditions where a light load is mounted upon the struts to prevent the load from being ejected out of the frame beyond the outer posts 101.

In ordinary operation of the load storage apparatus, a load to be stored is placed upon the platform 80 in its raised position as shown in FIGS. 1 and 2. The vertically movable frame 12 is then moved up the masts 14 until the channel guides 51 are brought into alignment with a pair of struts 102 of a selected load support 13 or 13'. The vertically movable frame 12 may be stopped in alignment with a selected load support by automatic means as disclosed in the aforementioned copending application or it may be stopped by manual actuation of suitable switches (not shown) under the direct control of an operator. The motor 58 is then energized to move the extractor out of the channel guides 51 and into the struts 102 of a load support with the rollers 54, 54a, and 56 engaging said struts in same manner as they engage said channel guides.

As shown in FIG. 2 with the platform 80 raised, a load supporting pallet 83 is disposed above the upper flanges of the channel guides 51 and, therefore, passes above the upper flanges of the pair of aligned struts at the load support. This enables the loaded pallet 83 to move into the load storage frame to be deposited upon the upper surfaces of the load support struts when the platform 80 is subsequently lowered to its position below the upper flanges of the channel guides 51 and, therefore, below the upper flanges of the struts 102. The extractor is then withdrawn from the storage frame with the platform 80 in the lowered position whereby the load initially carried by said platform remains at the selected load support.

The reject mechanism represented by the reversing switch assemblies 85 and 85' operates to reverse the direction of movement of the extractor whenever an attempt is made to load at a load support upon which some article has already been placed. This is effected by an abutment member 94 striking the load already on the support thereby retracting the associated reject arm 89 and actuating one of the limit switches 86.

The reversing mechanism ordinarily works against the weight of a load already at the selected load support upon which an inadvertent attempt has been made to place a second load. In other words, a heavy pallet or a heavily loaded tray 105 affords such resistance to the laterally moving extractor that the reversing switch is actuated and the extractor is returned to the center of the aisle without any danger of pushing the load already on the load support out the back side of the frame.

In use of the apparatus, it has been found that where an attempt is made to double load at a load support occupied by a very light article such as an empty tray 105, the resistance afforded by the article is not sufficient to actuate the reject mechanism. It was found that a light plastic tray having a smooth bottom surface, supported only at the edges, and having a weight of approximately six pounds would fail to actuate the reject mechanism; and as a consequence thereof, it would be shoved out of the storage frame beyond the outer posts 101. However, by providing the load stops 103 such accidents were effectively prevented. An example of the conditions referred to is shown in FIGS. 1 and 6 wherein each load support has a lightweight, plastic tray 105 therein. The article might be overlooked by a carrier operator the consequence of which would be an attempt to load at an already loaded load support. In such instance, the reject arms 89 would be raised above the level of the upper flanges of the struts due to the fact that the load carrying platform would be in its raised, load carrying position. As shown in FIG. 4, this brings the abutment member 94 of a reject arm into alignment with the tray 105 which is already on the load support. Said abutment member then strikes the tray which seats against the stop 103, said stop acting through said tray and causing said arm to move inwardly with the consequent tripping of the associated switch 86 as hereinbefore described. In this case of very light loads, it is, in effect, the load stops 103 which cause the reversing of the extractor by affording resistance to the pressure sensitive reject arm, which said resistance is transmitted to said arm through the medium of the load itself. Both switches 86 are so connected with the motor 58 that the tripping of one of them reverses said motor and thereby reverses the direction of movement of the extractor.

Control means for operating the load carrier 10 is shown in the electrical diagram of FIG. 9. This diagram refers only to the reversible extractor motor 58 and the reversing system connected therewith including the reversing switch assemblies 85 and 85'. Such other control means as desired may be used for automatically moving the vertically movable frame 12 up to or down from the selected load support 13 or 13' such as that comprehensively discussed in the above referred to copending application.

The extractor motor 58 is energized through three main leads L1, L2, and L3. The motor 58 is provided with an electrically operated brake 57 connected in series with the motor through the lines L1', L2', and L3'. Whenever the motor 58 is energized to move the extractor in either direction, the brake 57 is simultaneously energized to move to open or released position through the lines L1', L2', and L3'. Whenever the motor 58 is completely de-energized, the brake 57 is also de-energized and automatically moves to the closed or braking position whereby the extractor is stopped in whatever position it may be in at the time.

The reversing system is energized through a transformer 110 which is connected at its primary winding to the leads L1 and L3 by conductors 111 and 112 respectfully and is provided with conductors 113 and 114 coming from its secondary winding to energize said system.

For the purpose of explaining the operation of the apparatus, it will be assumed that the vertically movable frame has been stopped in such position as to align the extractor 50 with a selected pair of horizontally co-planar load supports 13–13' and that the extractor is centered between the load storage frames 11 and 11' whereby a normally closed centering switch 45 mounted on the vertically movable frame is held in open position by a trip 46 of the extractor 50. It will be further assumed that the vertically movable frame has been brought to and stopped at the position described either by automatic or manual control means, not herein disclosed.

The operator first turns a selector switch 115 to either the full line, closed position indicated at 115R or the dotted line, open position 115L depending upon whether or not the extractor is to move right or left respectively. The selector switch 115 is connected across the conductors 113 and 114 in series with a selector coil C3. If the operator places the selector switch in the position 115R and then presses the manually actuatable, normally open start switch 1, a circuit is formed from the conductor 113 through a normally closed stop switch 2, said start switch 1, reversing switches 86 of the switch assemblies 85 and 85', and coil C2 to conductor 114. Coil C2 is thereby energized closing normally opened contacts C2a and C2b and opening normally closed contacts C2c. Closing of the contacts C2a immediately energizes coil C1 by a circuit from conductor 113 through stop switch 2, start switch 1, contacts C2a, and coil C1 to conductor 114. Energization of coil C1 immediately closes normally opened contacts C1a and C1b.

The closing of contacts C1b completes a circuit from the conductor 113 through the closed selector switch 115 and the coil C3 to the conductor 114. Coil C3 thereby closes normally open contacts C3a, opens normally closed contacts C3b, closes normally opened contacts C3c, and opens normally closed contacts C3d. The contacts C3a, C3b, C3c, and C3d are selector contacts and control the energization of right and left motor coils CR and CL. A circuit is now formed from the line 113 through contacts C2b now closed, contacts C3a now closed, and coil CR to conductor 114. Contacts CRa, CRb, and CRc in the main leads L1, L2, and L3 respectively are closed by the coil CR whereby the motor 58 is energized to move the extractor to the right or in the direction of the storage frame 11, and simultaneously the brake 57 is energized and released. Coil CL remains de-energized because normally closed contacts C2c and C3b are now open and no circuit can be formed to said coil.

If when the extractor is started toward the right when it is carrying a load to be deposited at the selected load support 13, the platform 80 will be in the raised position thereby disposing the reject arm 89 and the abutment member 94 of the switch assembly 85 in the broken line position of FIG. 4. Said abutment member will, therefore, strike the tray 105 which is already on the selected load support of the right-hand storage frame. As shown in FIG. 6, this will trip the switch 86 of the reversing switch assembly 85 thereby opening said switch and cutting off the current to the coil C2. The contacts C2a then open thereby completely isolating the coil C2 whereby coil C2 cannot become re-energized even though the switch 86 of the switch assembly 85 closes again. The coil C1 remains energized because as soon as the extractor began to move, the trip 46 moved away from the normally closed switch 45 whereby a circuit was formed from the conductor 113 through said switch 45, contacts C1a held closed by coil C1, and said coil C1 to conductor 114.

De-energization of the coil C2 allows the normally open contacts C2b to reopen and the normally closed contacts C2c to reclose. The coil CR, which effects movement of the extractor to the right, is thereby isolated since no current now flows through contacts C2b or the now open contacts C3d. However, the coil CL, for effecting movement of the extractor to the left, is now energized by a circuit from the conductor 113 through the contacts C2c, contacts C3c, now closed, said coil CL, and the conductor 114. De-energization of the coil CR opens the normally open contacts CRa, CRb, and CRc and energization of the coil CL closes reversing contacts CLa, CLb, and CLc thereby reversing the direction of rotation of the motor 58 and causing the extractor 50 to move towards the left or back toward the center of the aisle between the two load storage frames.

As soon as the extractor moves back to the position shown in FIG. 1 or FIG. 3, the centering switch 45 is again opened by the trip 46 of said extractor. Opening of the switch 45 isolates the coil C1 whereby the contacts C1a and C1b reopen, and opening of the contacts C1b isolates both of the coils CR and CL thereby opening contacts CLa, CLb, and CLc to stop the motor. With the stopping of the motor, the brake 57 is engaged and the extractor is stopped in a centered position between the two storage frames.

Service to the left hand storage frame 11' is effected by turning the selector switch 115 to the dotted line position of 115L wherein the contacts of said selector switch are maintained in open position. This isolates the coil C3 throughout all the subsequentially described movements and maintains the contacts C3a, C3b, C3c, and C3d in the positions illustrated in FIG. 9.

Pushing the start button 1 energizes coil C2 as before whereby contacts C2a close to energize coil C1 and contacts C2b and C2c reverse their illustrated positions. Contacts C1b in line 113 close and a circuit is formed through the contacts C2b now closed, contacts C3b, coils CL and conductor 114. Contacts CLa, CLb, and CLc are thereby closed to cause the motor 58 to move the extractor toward the left or in the direction of the load storage frame 11'.

If a tray or the like is already on the selected left-hand load support 13', the switch assembly 85' is actuated whereby the switch 86 thereof opens and isolates the coil C2. Contacts C2a thereby open, but as before, coil C1 remains energized since the trip 46 has moved off of the switch 45 and said switch is closed to maintain the coil C1 energized. De-energization of coil C2 causes the contacts C2b and C2c to assume the positions illustrated whereby the coil CL is isolated due to the opening of contact C2b and the fact that contacts C3c are already open. However, a circuit is formed to the coil CR from the conductor 113 through the now closed contacts C2c, contacts C3d, and said coil CR to the conductor 114. Contacts CLa, CLb, and CLc are thereby opened and contacts CRa, CRb, CRc are thereby closed with the result that the extractor motor 58 reverses itself and begins to move the extractor toward the right as shown in FIG. 1 or back to the center of the aisle. When the trip 46 again reaches the switch 45, said switch opens, coil C1 is de-energized, and contacts C1b open to isolate both motor coils CR and CL to stop the extractor.

It will be noted that depressing the normally closed, manually operated stop switch 2 will cause the extractor to stop in any position. Opening of stop switch 2 isolates both the coil C1 and coil C2 by opening their respective holding contacts C1a and C2a, and even when the stop switch is released and its contacts again close, neither of the aforementioned coils are re-energized. At the same time, contacts C1b have opened thereby isolating the motor coils CR and CL whereby the extractor stops.

It will be understood that the starting switch 1, herein illustrated and described as a manually actuatable switch, may be a switch responsive to the movement of the vertically movable frame 12 to a selected load support level whereby when the extractor reaches the selected level, it will automatically move into the selected load support. Such an automatic system is fully disclosed in the referred to copending application.

It will be understood that many changes in the details of the invention as herein illustrated and described may be made without, however, departing from the spirit thereof or the scope of the appended claims.

What is claimed is:

1. In a load storage apparatus, a load support comprising a pair of spaced, channel shaped members having their open sides facing each other; said members having upper and lower parallel flanges; an extractor movable into said support between said members and supported at its edges by said lower flanges; a vertically movable platform mounted upon said extractor and movable from a load release position below said upper flanges to a load support position above said upper flanges; power means moving said extractor into and out of said support to deposit or retrieve a load thereat by bridging said load across said members; pressure sensitive reversing means mounted upon said platform in such manner as to strike a load bridged across said members when said platform is in the load support position only; said power means responsive to actuation of said reversing means in such manner as to reverse the direction of movement of said extractor; said load support having stop means disposed beyond a load thereon in the direction of movement of said extractor into said support whereby a load on said support which is too light to actuate said reversing means is retained against sliding to effect positive actuation of said reversing means.

2. A load storage apparatus as set forth in claim 1 wherein said stop means comprise a portion of each said member turned upwardly to engage the load.

3. A load storage apparatus as set forth in claim 1 including a storage frame; said storage frame having a plurality of said supports in vertical alignment; a vertically movable carrier movable past said supports; means for moving said carrier to a selected support; said extractor mounted upon said carrier and movable laterally therefrom in the direction of said storage frame.

4. A load storage apparatus as set forth in claim 3 including two of said storage frames facing each other and spaced to afford an aisle therebetween; said supports of said storage frames being disposed in opposite pairs across said aisle; said carrier movable in said aisle and said extractor movable laterally toward either said storage frame.

5. A load storage apparatus as set forth in claim 4 including control means automatically stopping said carrier in the center of said aisle after said reversing means has been actuated to reverse the direction of movement of said extractor.

6. In a load storage apparatus, a load support comprising a pair of horizontally disposed, spaced ledge members having free edges directed toward each other; a horizontally disposed extractor movable into the area generally defined by said member; said extractor having means providing a load carrying surface; power means moving said extractor load carrying surface in use between a lowered load released position below said members vertically past said members to a raised load supporting position above said members; power means operatively connected to said extractor for moving said extractor into and out of said area to deposit or pick up a load thereat bridged across said members; pressure sensitive control means fixedly mounted at a predetermined level with respect to said load carrying surface and movable with said surface between the two abovementioned positions below and above said members whereby it strikes a load bridged across said members when said load carrying surface is in the raised load supporting position only and passes under a load bridged across said members when said load carrying surface is in the lowered load released position; said second mentioned power means responsive to actuation of said control means in such manner as to stop movement of said extractor; and said load support having stop means disposed beyond a load thereon in the direction of movement of said extractor into said area to prevent sliding movement of a load on said support and ensure actuation of said control means.

References Cited by the Examiner

UNITED STATES PATENTS

| | | | |
|---|---|---|---|
| 2,451,368 | 10/48 | White et al. | 214—16.42 |
| 2,602,557 | 7/52 | Sinclair. | |
| 2,752,051 | 6/56 | Strahm et al. | |
| 2,804,218 | 8/57 | Sylvester et al. | 214—16.42 |
| 2,899,087 | 8/59 | Jacobsen. | |
| 2,904,197 | 9/59 | Asheim et al. | 214—16.14 X |
| 2,941,738 | 6/60 | Burke et al. | 214—16.42 X |

HUGHO O. SCHULZ, *Primary Examiner.*

GERALD M. FORLENZA, *Examiner.*